Sept. 13, 1960     O. W. BARKER ET AL     2,952,190
BACKLASH ELIMINATOR

Filed July 5, 1956                                      4 Sheets-Sheet 1

INVENTORS.
Orrin W. Barker, &
John G. Osburn.
BY
Elroy J. Wutschel
Attorney

INVENTORS.
Orrin W. Barker,
BY John G. Osburn.

Sept. 13, 1960   O. W. BARKER ET AL   2,952,190
BACKLASH ELIMINATOR
Filed July 5, 1956   4 Sheets-Sheet 3

INVENTORS.
Orrin W. Barker, &
John G. Osburn.
BY
Attorney

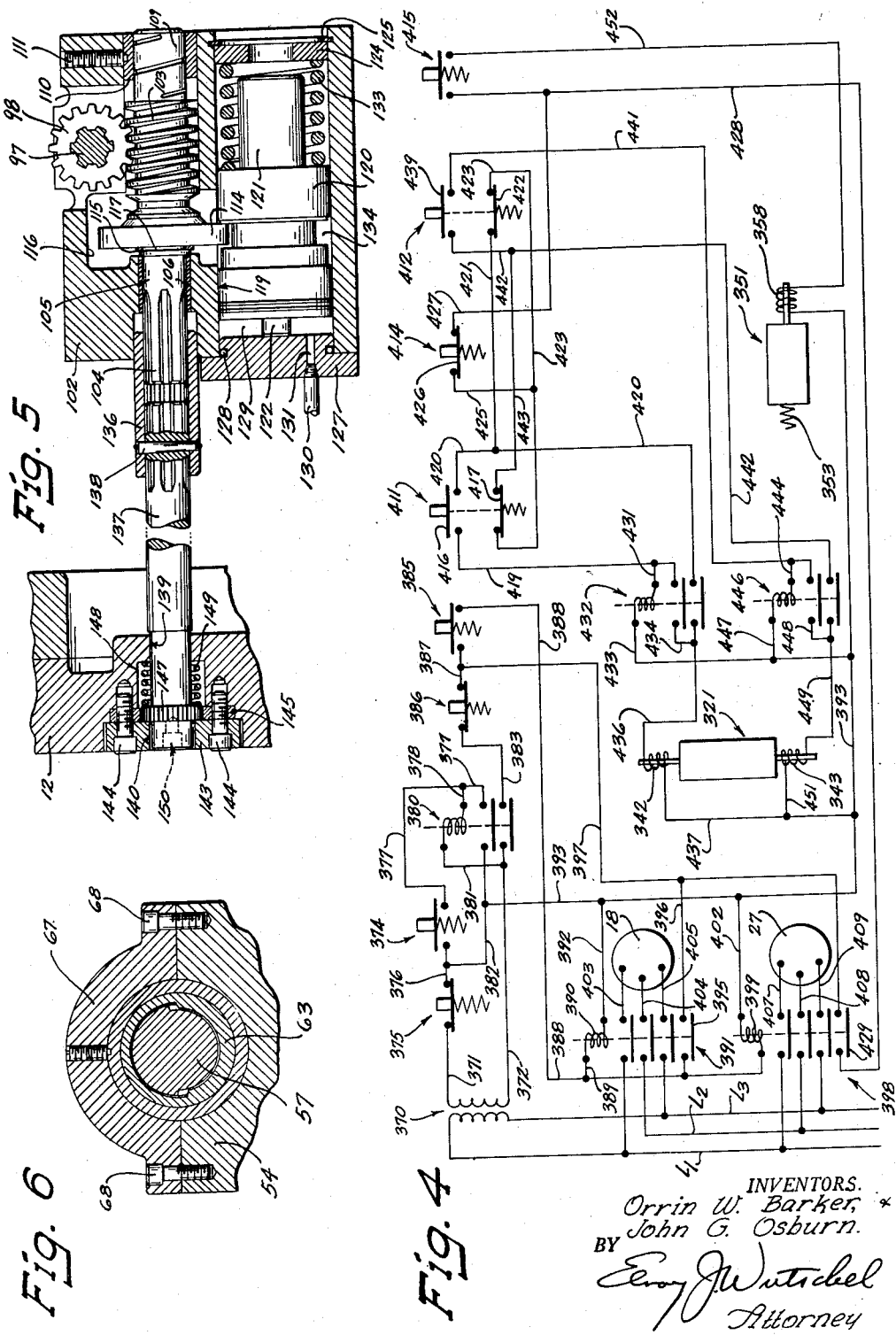

United States Patent Office 2,952,190
Patented Sept. 13, 1960

2,952,190

BACKLASH ELIMINATOR

Orrin W. Barker, New Berlin, and John G. Osburn, Milwaukee, Wis., assignors to Kearney & Trecker Corporation, West Allis, Wis., a corporation of Wisconsin Filed July 5, 1956, Ser. No. 596,090

4 Claims. (Cl. 90—22)

This invention relates generally to an improved backlash eliminator for machine tools, and more specifically to an improved selectively adjustable anti-backlash mechanism incorporating automatic release means for easing off the degree of lash adjustment during predetermined portions of an operating cycle.

The principal object of this invention is to provide an improved anti-backlash mechanism for a machine tool.

Another object of the invention is to provide an anti-backlash mechanism incorporating an improved manual adjustment mechanism for varying the degree of backlash adjustment.

Another object of the invention is to provide an improved controlling apparatus for an anti-backlash mechanism providing means for both varying the degree of backlash adjustment, as well as easing off the backlash adjustment mechanism during certain cycles of operation.

Another object of the invention is to provide an improved control apparatus for an anti-backlash mechanism in a machine tool.

A further object of the invention is to provide an improved mounting arrangement for an anti-backlash mechanism that facilitates manual adjustment thereof to vary the degree of backlash removal.

A still further object of the invention is to provide an improved anti-backlash mechanism for a translating device of the nut and screw type in combination with an improved directional control system for selectively controlling the direction of relative rotation between the cooperating screw and nut mechanism.

A still further object of the invention is to provide an improved anti-backlash mechanism arranged to minimize frictional resistance to facilitate manual adjustment.

A still further object of the invention is to provide a two speed directional control system for a cooperating screw and nut translating mechanism that is provided with an anti-backlash mechanism operably connected in a manner to be automatically eased off during one speed of operation.

According to this invention, a milling machine of the bed type, having a horizontally journalled power driven tool spindle, is provided with a supporting frame carrying a slidably reciprocable work supporting table in operative relationship to the tool spindle. To effect translatory movement of the table along the base, a non-rotatable feed screw is secured at its opposite ends to depending brackets secured at the opposite underside of the table in a manner to operatively engage a pair of spaced apart feed nuts journalled to rotate in the base. A pair of gears secured to the feed nuts are operatively connected to be driven by a common driving pinion in a manner that the nuts are retained in constant angular positions relative to each other. One of the feed nuts is restrained against axial movement by means of a thrust bearing mounted in the base, while the other nut is disposed for a slight axial movement toward the first nut in a manner that a portion of the feed screw therebetween is placed under a predetermined degree of compression to remove any backlash that may exist between the cooperating nuts and the non-rotatable feed screw. To accomplish this, a tubular adjusting sleeve carried for both rotatable and axial movement is disposed to abut with one end against an antifriction thrust bearing that in turn is operative to exert axial force against the movable nut element. The adjusting sleeve is provided on its outer periphery with a helically formed ball receiving groove that is disposed to cooperate with a similar internal helically formed ball receiving groove within an encircling sleeve fixedly carried within the base and that cooperates therewith to constitute a ball receiving race. A plurality of bearing balls constrained within the cooperating grooves respectively formed in the cooperatively associated sleeves are adapted to support the adjusting sleeve for both rotatable and axial movement. By means of this arrangement, it will be apparent that the adjusting sleeve is operatively supported for relatively friction free movement by the bearing balls engaging the helical groove in its periphery, as well as the antifriction thrust bearing at one end thereof. Thus, rotational movement of the adjusting sleeve operates to effect axial movement thereof to, in turn, effect axial movement of the movable nut toward the stationary nut in a manner to remove any backlash that may exist between the feed nuts and the feed screw. An adjusting mechanism is connected to provide for manual rotation of the adjusting sleeve to effect a predetermined degree of tightness between the threads of the spaced apart feed nuts and the cooperating thread of the feed screw to remove backlash therebetween. To provide for free operation during certain conditions, such as in rapid traverse, a hydraulic piston connected to a source of fluid under pressure is connected to modify the operation of the control mechanism to rotate the adjusting sleeve in an opposite direction. With this condition existing, the cooperating feed nuts are so positioned as to minimize frictional engagement with the cooperating feed screw during rapid traverse rates of movement.

The foregoing and other objects of the invention which will become more fully apparent from the following detailed specification, may be achieved by the particular anti-backlash mechanism described herein by way of example as a preferred embodiment of the invention in connection with the accompanying drawings, in which:

Fig. 4 is a schematic electrical circuit diagram operative to control the hydraulic circuit shown in Fig. 3 for selectively operating the machine;

Fig. 5 is an enlarged fragmentary view in transverse vertical section through the manually adjustable and automatically releasable control mechanism for the anti-backlash device; and, Fig. 6 is an enlarged fragmentary view in vertical section through the feed screw mechanism, including a portion of the supporting structure, and taken generally along the lines 6—6 in Fig. 2.

Figure 1:
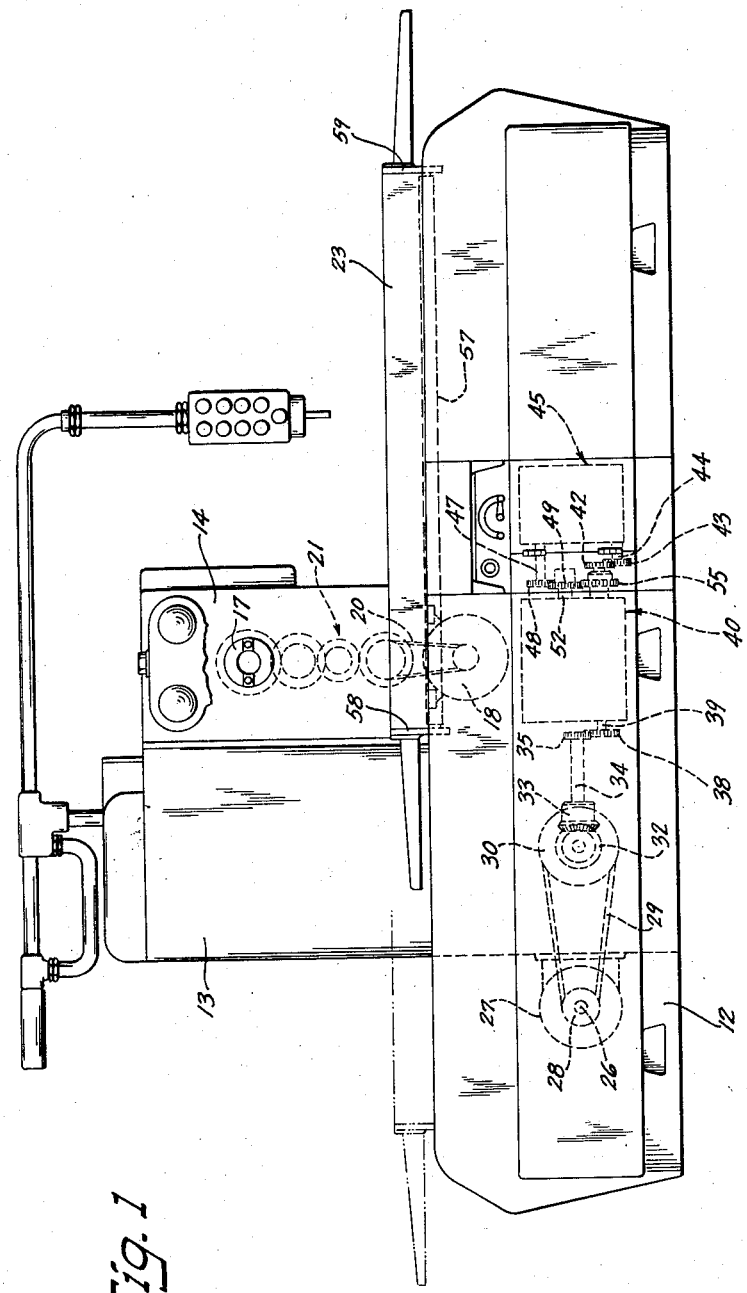
Figure 1 is a view in front elevation of a bed type milling machine incorporating a preferred embodiment of the invention; and, in which, the power driving trains for the feed drive as well as the tool spindle are schematically represented.

The particular machine tool illustrated in the drawings as exemplifying apparatus of the class adapted to be constructed and operated in accordance with the present invention, is primarily a milling machine of the bed type, although it is to be understood that the invention may be applied with equal advantage to other machines of different construction.

Referring more particularly to the drawings, the machine tool there shown as incorporating a preferred embodiment of the present invention is a horizontal spindle milling machine of the bed type. As shown in Fig. 1, the machine comprises a hollow supporting base or bed 12, having secured to one side thereof a vertically upstanding column or upright 13, which in turn is disposed to movably support a vertically adjustable spindle head 14. A horizontal tool carrying spindle 17 is rotatably journalled in the spindle head and is operatively connected to be driven by a spindle motor 18 bolted to the underside of the spindle head. Power is transmitted from the spindle driving motor 18 by means of a belt 20 and a selectively adjustable gear transmission 21 to rotate the tool spindle 17 at a selected speed in well known manner. The entire spindle head 14 together with the tool spindle 17 and the associated driving mechanism therefor is adapted to be vertically adjustable along the upright 13 by means of an elevating mechanism (not shown).

Beneath a cutter (not shown) that may be carried by the tool spindle 17, there is disposed a work supporting table 23 that is slidably supported on the upper surface of the bed 12 for selective reciprocable movement in a horizontal plane. For guiding the worktable during reciprocable movement, way surfaces formed toward the opposite upper sides of the base 12 are disposed to be engaged by complementary way surfaces formed on the opposite undersides of the worktable 23, in well known manner. As indicated in Fig. 2, there are shown only the cooperating front bed way 24 and table way 25 toward the front of the machine.

Power for driving the worktable 23 is derived from a feed motor 27 fixedly secured to a side wall of the column 13 and being provided with a motor shaft 26 extending inwardly into the hollow bed 12 through a suitable opening formed in the rear wall thereof. The feed motor is adapted to supply power for rotating a main pulley 28 secured to the shaft 26 within the bed 12. Power from the motor driving pulley 28 is transmitted by means of a belt 29 disposed to engage a cooperating driven pulley 30 journalled within the bed 12 and that in turn is connected to drive a bevel gear 32. The bevel gear 32 is disposed to transmit power to a cooperatively meshing bevel gear 33 secured to one end of a shaft 34 rotatably journalled within the bed and having secured to its opposite end a spur gear 35. Power is in turn transmitted from the gear 35 to a cooperatively meshing spur gear 38 secured to one end of a drive shaft 39 that extends through and is rotatably journalled in a feed and rapid traverse driving mechanism 40, as shown in Figs. 1 and 2. To the opposite end of the drive shaft 39, there is secured a gear 42 having meshing engagement with a complementary gear 43 carried by an input power shaft 44 journalled in, and connected to supply input driving power to a feed change transmission mechanism 45. The feed change transmission mechanism 45 may be of any well known type such as the pick-off gear or shiftable gear type. From the feed transmission 45, power to drive the worktable 23 at selected feeding rate is transmitted by an output shaft 47 carrying a gear 48, that in turn meshes with an idler gear 49 journalled to rotate, by means of bearings 50 and 51, about a stub shaft extension 52 secured to the right side wall of a supporting frame 54 for the feed and rapid traverse drive mechanism 40. From the idler gear 49 power is transmitted to a cooperatively meshing input feed drive gear 55 journalled to rotate about the feed drive shaft 39. The feed drive gear 55 constitutes the source of input feed driving power for the feed and rapid drive mechanism 40.

Figure 2:
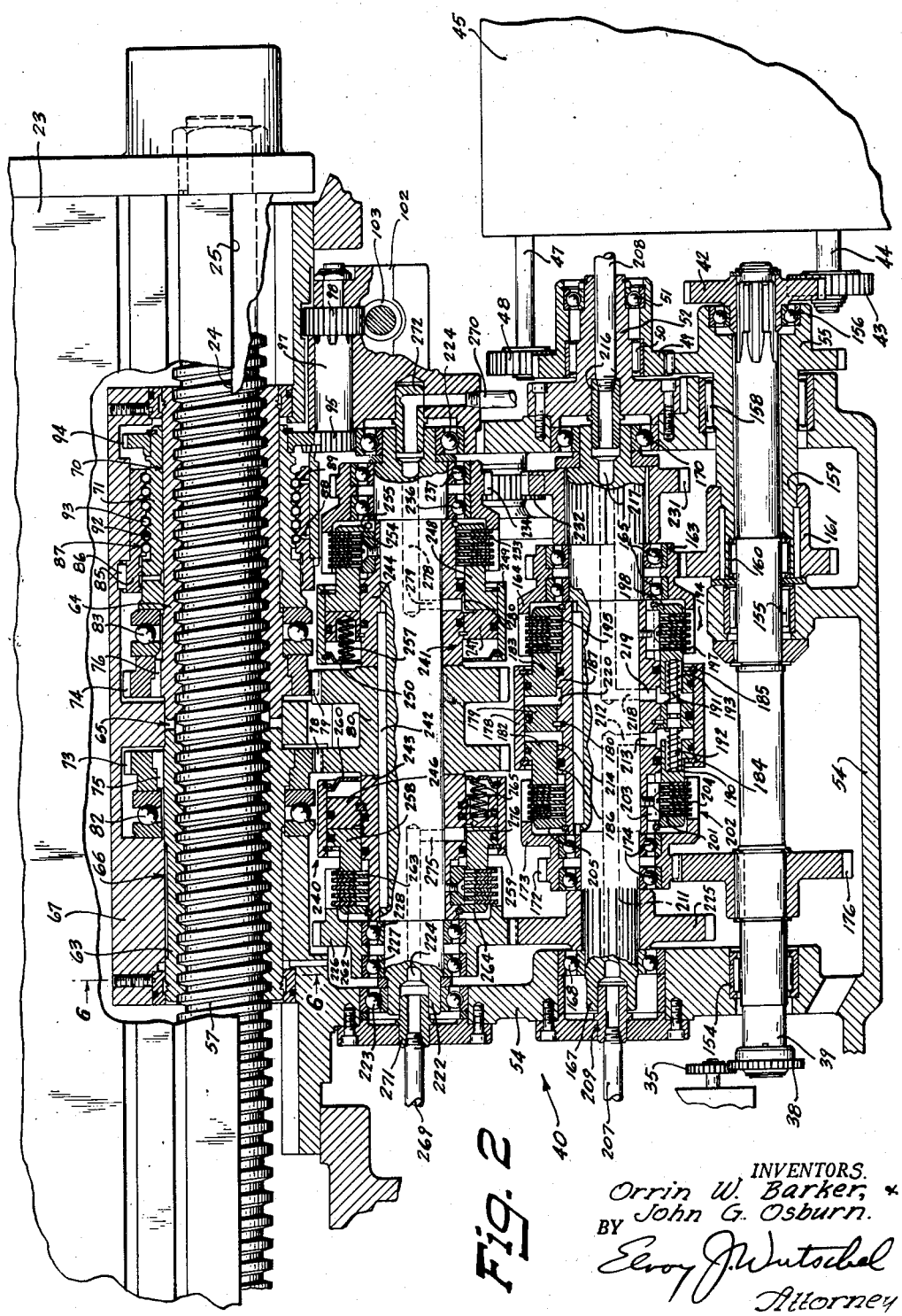
Fig. 2 is an enlarged view in vertical section through a portion of the table driving mechanism and showing the anti-backlash mechanism.

For effecting longitudinal translatory movement of the worktable 23 along the bed 12, a non-rotatable feed screw is disposed within a longitudinally extending hollow cavity formed in the underside of the table, and is secured at its opposite ends to a pair of depending end brackets 58 and 59 respectively secured to the opposite ends of the table, as shown in Figs. 1 and 2. The non-rotatable feed screw 57 is operatively engaged along its central portion by a pair of coordinately rotatable feed nuts 63 and 64, which respectively constitute separate nut elements of a single feed driving nut 65. The separate nut elements 63 and 64 are rotatably journalled in slightly spaced apart relationship within an upwardly extending portion of the feed and rapid traverse drive mechanism 40, and are adapted to be rotatably driven in synchronism to constitute in effect the single driving nut 65 which is operative to effect selective directional movement of the worktable 43 along the bed 12. To accomplish this, the nut element 63 is constrained for rotation within a tubular recess 66, constituted in part by a semicircular opening formed in the upper portion of the frame 54 and in part by a cooperating semicircular opening formed in a cap member 67. The cap member 67 is secured to the upper portion of the frame 54 by means of cap screws 68, as shown in Fig. 6. In a similar manner, the right nut element 64 is partially constrained for rotation within the tubular opening 66 and, in part, within a concentrically formed cylindrical opening 70 formed within a tubular adjusting sleeve 71.

For driving the nut elements 63 and 64 in synchronism, a pair of like size spur gears 73 and 74 are respectively secured to the opposed inner ends thereof by means of keys 75 and 76. To retain the nut elements 63 and 64 in positions of constant angularity relative to each other, the gears 73 and 74 are respectively disposed to engage the complementary meshing gears 78 and 79 secured to a single hub to constitute a common driving gear 80 rotatably carried within the feed and rapid traverse mechanism 40. Thus, irrespective of the rate of rotation of the common drive gear 80, the driven gears 73 and 74 as well as the feed nut elements 63 and 64 are retained in constant positions of angularity relative to each other, and operate to effect translatory movement of the non-rotatable feed screw 57 therethrough.

To restrain the feed nut 63 against leftward axial movement, the outer side face of the driven gear 73 abuts one race of an antifriction thrust bearing 82 having its opposite race abutting a flanged edge formed in the frame 54 and cap member 67. In a similar manner, the outer side face of the gear 74 abuts one race of an antifriction thrust bearing 83 having its opposite race abutting an end face of the adjusting sleeve 71. The adjusting sleeve 71 is axially movable in a leftward direction to force the thrust bearing 83, the gear 74, and nut element 64 leftwardly. Leftward movement of the nut element 64 is in opposition to the nut element 63 which, together with the driven gear 73, is restrained against leftward movement by the thrust bearing 82. By means of this arrangement, that portion of the feed screw respectively engaged by, and between, the nut elements 63 and 64 is placed under a selected degree of compression to remove any backlash that may exist between the synchronously rotatable nut elements 63, 64, and the feed screw. With the adjusting sleeve 71 moved leftwardly to remove backlash, it will be apparent that the left face of the threads in the nut element 64 engage the right face of the helical thread on the feed screw 57 in opposition to the right face of the thread in the nut element 63 engaging the cooperating left face of the helical thread on the feed screw 57.

To selectively control the degree of leftward axial force exerted against the first bearing 83, the adjusting sleeve 71 is rotatably mounted within a tubular guide sleeve 85 that is fixedly secured within an enlarged portion of the cylindrical opening 65 by means of a key 86 engaging a keyway in the cap member 67. The inner periphery of the guide sleeve 85 is provided with an internally formed helical ball receiving groove 87 which is interrupted at its opposite ends by a pair of inwardly extending pins 88 and 89, secured within the sleeve 85, and adapted to constitute ball stops. In a similar manner, the outer periphery of the adjusting sleeve 71 is provided with a helical ball receiving groove 92 adapted to cooperate with the groove 87 in the sleeve 85 to constitute a ball receiving raceway. A plurality of bearing balls 93 are operatively constrained within the opposed grooves 87 and 92 respectively presented by the sleeve 85 and the adjusting sleeve 71. In this manner, the adjusting sleeve 71 is guidably constrained within a helically formed antifriction bearing, so arranged that rotational movement of the sleeve 71 operates to effect axial movement thereof. The stops 88 and 89 interrupting the internally formed groove 87 operate to constrain the bearing balls 93 in operatively interposed relationship between the cooperating guide sleeve 85 and adjusting sleeve 71. As clearly shown in Fig. 2, the adjusting sleeve 71 performs a dual function in being axially movable to remove backlash and, at the same time, constituting a sleeve bearing for rotatably supporting the movable nut element 64.

To selectively vary the degree of backlash removal between the cooperating feed nuts 63 and 64 relative to the cooperating feed screw 57, a spur gear 94 secured to the outer end of the adjusting sleeve 71 is disposed to meshingly engage another gear 95 that in turn is fixedly secured to one end of the shaft 97 journalled for rotation in a wall of the frame 54. The helical pinion 98 is in turn connected to be meshingly engaged by a helical rack 103 that is mounted for both slidably longitudinal as well as rotational movement about an axis perpendicular to the axis of the gear 98. To this end, the helical rack 103 is provided with a splined driving end 104 and a bearing portion 105 that is engaged by a cylindrical bearing 106 formed in a wall of a separate housing 102, is shown in Fig. 5, and that in turn is secured to the frame 54. Toward its inner rearward end, the helical rack 103 is provided with a pilot or bearing portion 109 fitted for rotational and axial movement within a sleeve bearing 110 secured within a circular recess in the housing 102 by means of a dog point set screw 111. Toward the central portion of the helical rack 103, there is secured an enlarged circular plate member 114 that is provided with a bored opening (not shown) and is retained in abutting engagement with a flanged shoulder integrally formed with the rack by means of a snap ring 115. The circular plate member 114 is disposed within an enlarged circular recess 116 formed in the housing 102, and is axially movable therein with the helical rack 103, which is guided during such movement by the bearing 106 and the sleeve bearing 110.

As shown in Fig. 5, the complete range of axial movement of the rack 103 and plate member 114 in a forward direction is limited by a flange shoulder 117 adjacent the cylindrical bearing 106. In a similar manner, the range of rearward axial movement of the helical rack 103 and plate member 114 secured thereto is limited by the inner side face of the sleeve bearing 110. During actual operation, however, the rack 103 is caused to be moved axially through a range slightly less than that delimited by the shoulder 117 and the bearing 110.

To this end, the enlarged circular recess 116 is arranged to open into the central portion of an hydraulic cylinder 119 formed in the housing 102 and disposed in parallelism with the axis of the rack 103. Within the hydraulic cylinder 119 there is provided a selectively movable hydraulic piston 120 having integrally formed therewith an enlarged rearward circular stop 121, as well as a forward stop 122 of greatly reduced diameter. The inner or rearward end of the cylinder 119 is delimited by a circular plate 124 that is secured therein by means of a snap ring 125. At its opposite end, the cylinder 119 is enclosed by a flanged circular cover 127 that is tightly fitted within the cylindrical opening by means of an O-ring 128 to provide a leak proof enclosure 129 immediately forward of the hydraulic piston 120, for receiving hydraulic fluid under pressure. An hydraulic line 130 connected at its opposite end to receive hydraulic fluid under pressure, as will hereinafter be more fully explained, is connected to a bored inlet 131 in the cover 127 for selectively controlling the admission of hydraulic fluid into the enclosure 129. Hydraulic fluid admitted through the line 131 to the enclosure 129 effects a rearward movement of the piston 120, movement being stopped by engagement of the rear face of the stop member 121 engaging the inner face of the circular rear cover 124.

Whenever there is no fluid under pressure admitted through the line 130, the piston is normally biased to its forward position with the circular stop 122 engaging the inner face of the front circular cover plate 127 as shown in Fig. 5. To accomplish this, a compression spring 133 is operatively interposed between the rear face of the piston 120 and the inner face of the rear cover 124 and in a manner to encircle the enlarged circular rear stop member 121. By means of this arrangement, it will be apparent that the spring 133 normally urges the piston 120 forwardly until the stop 122 engages the front cover 127. Selective admission of hydraulic fluid through the line 130 and 131 enters the enclosure 129 and effects a rearward movement of the piston 120 in opposition to the spring 133 until the stop 121 engages the rear cover 124. Axial movement of the piston 120 in either direction operates to effect a corresponding axial movement of the helical rack 103 in a corresponding direction. To effect this result, as shown in Fig. 5, the piston 120 is provided with an annular recess 134 that is engaged by the outer edge of the circular plate member 114 secured to the helical pinion 103.

Thus, with the condition illustrated in Fig. 5, the compression spring 133 urges the piston 120 forwardly to in turn retain the circular plate member 114 and the helical rack 103 in their extreme forward positions, as determined by the forward stop 122 engaging the cover 127. With this condition existing, it is possible to manually rotate the helical rack 103 in a manner to effect rotation of the helical pinion 98, and, thereby tighten or loosen the degree of tightness between the feed nuts 63, 64 and the feed screw 57. For effecting manual adjustment, a splined sleeve 136 is adapted to slidably engage the outer splined end 104 of the helical rack 103. The splined sleeve 136 is, in turn, secured to the splined end of an adjusting shaft 137 by means of a pin 138. At its forward end, the adjusting shaft 137 is journalled to rotate within a bored opening 139 formed in the front wall of the bed 12 as well as a concentrically formed bored opening 140 formed in a bracket 143 that is secured within an enlarged circular recess in the bed wall by means of cap screws 144. The bracket 143 together with the cap screws 144 are adapted to retain in position a locking collar 145 that is provided with a circular opening having internal serrations adapted to engage the external serrations formed on the periphery of a circular member 147 secured to the shaft 137. The externally serrated member 147 is adapted to be moved inwardly, upon inward movement of the shaft 137, within a circular recess 148 formed in the front wall of the bed 12. A compression spring 149 seated at its inner end against the column wall is adapted to urge the externally serrated circular member 147, together with the shaft 137, forwardly into locking engagement with the internally serrated collar 145 carried by the wall of the column 12, as shown in Fig. 5. To effect selective rotational adjusting movement of the shaft 137 and the helical rack 103 an hexagonal socket opening 150 formed in the forward end of the shaft 137 is adapted to receive an appropriate wrench or key (not shown). Thus, by inserting a wrench in the opening 150, the shaft 137 can be moved bodily inward and then rotated to the desired angularly adjusted position. Upon releasing the shaft 137, the spring 149 operates to urge the shaft and serrated locking member secured thereto forwardly into locked position with the collar 145.

By means of the aforedescribed arrangement, the adjusting shaft 137 can be selectively rotated to the desired position for adjusting the feed nuts 63, 64 to the proper degree of tightness, and then the shaft 137 is locked in selected position. After this has been accomplished, the feed nuts 63, 64 are in the proper degree of tightness relative to the feed screw 57 for normal feeding movements during a milling operation. To release the tight degree of engagement between the nuts 63 and 64, hydraulic pressure through the inlet line 131, Fig. 5, is supplied to move the piston 120 and helical rack 103 axially inward thereby loosening or easing off the tightness between the feed nuts 63, 64 and the feed screw 57. Rearward movement of the rack 103, in response to hydraulic fluid admitted through the line 131 is limited by movement of the rear stop 121 into engagement with the rear cover 124. Thus, rotational movement of the adjusting shaft 137 and helical rack 103 is manually effected for tightening the backlash mechanism comprising the feed nut 63 and the axially movable feed nut 64. Likewise, axial movement of the helical rack 103 is effected by movement of the hydraulic piston 120 to selectively release or back-off the axially movable feed nut during rapid traverse movements of the table.

In actual operation, for example, the adjusting shaft 137 is rotated in a clockwise direction to effect clockwise rotation of the gear 98, as well as the gear 95, Fig. 2. Clockwise rotation of the gear 95 causes the gear 94 to rotate in a counterclockwise direction thereby rotating the adjusting sleeve 71 in a corresponding direction to effect leftward axial movement thereof in a manner to urge the axially movable feed nut 64 toward the feed nut 63. After the required degree of adjustment has been effected, the shaft 137, Fig. 5, is then immovably locked against further rotational movement. After this condition has been achieved, however, the adjusting sleeve 71, Fig. 2, may be rotated in an opposite or clockwise direction, if further adjustment is required, to permit easing off in the lash adjustment by selectively effecting an axial movement of the helical rack 103, Fig. 5, as hereinbefore explained.

The entire arrangement is such as to facilitate manual adjustment of the degree of tightness between the nut elements and the feed screw, irrespective of whether the table is being moved or is not being moved. It will be especially apparent that the adjusting sleeve 71, Fig. 2, is carried for relatively friction free adjusting movement. Both the antifriction thrust bearing 83, as well as the bearing balls 93 engaging the helical groove in the sleeve, cooperate to reduce to a minimum any frictional resistance that might be encountered during manual adjustment.

Furthermore, the relatively friction-free operation of the adjusting sleeve 71, Fig. 2, permits the use of a relatively small hydraulic piston 120, Fig. 5, which is connected to rotate the sleeve when the blacklash adjustment is eased off during fast rates of travel. Likewise, because of the greatly reduced friction between the adjusting sleeve 71 and its guiding parts there is provided an extremely fast response whenever the piston is hydraulically actuated to ease off the degree of lash adjustment.

To rotate the feed nut 65, Fig. 2, at a selected rate of speed, the driven gears 73 and 74 respectively secured to the nut elements 63 and 64 are connected to be rotated by the common driving pinion 80 in the feed and rapid traverse drive mechanism 40. The common driving pinion 80 is connectable to be driven in a selected direction of rotation by the feed and rapid traverse drive shaft 39 which is rotatably journalled in the frame 54 by means of bearings 154 and 155. At its rightward end, the shaft 39 is rotatably supported by the gear 42, secured thereto, having its hub engaged by the inner race of a third bearing 156. The outer race of the bearing 156 is carried within a circular recess formed in the outer hub of the concentrically rotatable feed input gear 55, which is rotatably journalled in a bearing 158 in the side wall of the frame 54. An elongated, inwardly extending hub 159 integrally formed with the gear 55, is journalled to rotate about the shaft 39 by means of a bearing 160.

Thus, driving power at a selected feed rate is transmitted from the input gear 55 to rotate a feed drive gear 161 splined to the inner end of the hub 159. The gear 161 meshingly engages a gear 163 integrally formed with an inwardly extending clutch housing 164 and that is journalled in bearings 165 for rotation about an independently rotatable rate change shaft 167. The leftward end of the shaft 167 is journalled to rotate in a bearing 168 having its outer race secured within an enlarged circular recess formed in the left wall of the frame 54. In like manner, the rightward end of the shaft 167 is journalled to rotate in the right side wall of the frame 54 by means of a bearing 170.

In leftwardly spaced relationship to the feed drive gear 163, there is provided a rapid traverse drive gear 172, integrally formed with an inwardly extending clutch housing 173, and that is journalled for rotating about the rate change shaft 167 by means of bearings 174. The rapid traverse drive gear 172 and clutch housing 173 are connected to be driven by a meshing gear 176 keyed to the leftward end of the feed and rapid traverse drive shaft 39. Thus, whenever the feed and rapid traverse drive shaft 39 is being rotatably driven, the feed drive gear 163 and the rapid traverse drive gear 172 are both connected to be continuously rotated in the same direction about the separately rotatable rate change shaft 167.

To connect one or the other of the gears 163 and 172 to drive the shaft 167 at a selected rate, a common tubular clutch spool or clutch actuating cylinder 178 encircling the shaft is positioned for axially slidable movement in either direction between the clutch housings 164 and 173 respectively associated with the gears 163 and 172. The tubular clutch spool 178 is guided for axial movement by the periphery of a stationary piston 179 secured to the central portion of an elongated tubular clutch support 181 by means of a snap ring 180. The elongated tubular clutch support 181 is in turn keyed to the central portion of the rate change shaft 167. Operatively positioned within the opposite tubular end portions of the spool member 178, at the opposite sides of the stationary piston 179, are a pair of outwardly extending cylindrical clutch actuating elements 182 and 183 respectively. The cylindrical clutch elements 182 and 183 are respectively secured within the tubular end portions of the member 178 by snap rings 184 and 185 respectively. At their inner peripheries, the clutch elements 182 and 183 are carried for axial slidable movement by a pair of spaced apart flanged bearings 186 and 187 integrally formed with the tubular clutch support 181.

To retain the clutch elements 182 and 183, together with the connecting tubular clutch spool 178 in a central neutral position relative to the stationary piston 179, there are provided a plurality of circumferentially spaced springs 190 and 191. The springs 190 are respectively disposed to encircle a plurality of outwardly extending pins 192 secured to the leftward face of the stationary piston 179 in circumferentially spaced relationship. Both the springs 190 and the pins 192 are received at their opposite outer ends within a plurality of circular bored openings formed in corresponding circumferentially spaced relationship in the inner face of the clutch element 182. In a similar manner, the springs 191 are respectively disposed to encircle a plurality of pins 193 secured in circumferentially spaced relationship to the right face of the stationary piston 179. At their opposite ends, the springs 191 and the pins 193 are disposed to be received within a plurality of circumferentially spaced, circular bored openings formed in the clutch element 183. In this manner, the springs 190 and the springs 191 are disposed to exert a balanced outward force to retain the clutch elements 182 and 183, as well as the connecting tubular clutch spool 178 in a central neutral position relative to the stationary piston 179.

Axial rightward movement of the clutch element 183 effects engagement of a feed drive clutch 194 by urging a plurality of floating clutch plates 195, keyed at their inner periphery to the tubular support element by means of a key, into driving frictional engagement with a plurality of clutch plates 197, secured at their outer periphery to the clutch element 164. The clutch plates 197 and 195 are retained in frictional driving engagement between a pressure plate 198 secured to the tubular clutch support member 181 and the rightwardly moved clutch element 183, thereby operatively connecting the feed drive gear 163 to rotate the rate change shaft 167 at a selected feed rate.

In a similar manner, leftward movement of the clutch element 182 operates to engage a rapid traverse clutch 202 by urging a plurality of clutch plates 201 secured at their inner periphery to the member by a key 203 into frictional engagement with a plurality of clutch plates 204 secured at their outer periphery to the clutch element 173. With the clutch element 182 urged in a leftward direction, the clutch plates 201 and 204 are retained in frictional driving engagement in opposition to a pressure plate 205 secured at its inner periphery to the tubular clutch support member 181. During such a condition of operation, the rapid traverse gear 172 is connected by means of the clutch plates 201 and 204 to rotate the rate change shaft 167 at a corresponding fast, or rapid traverse rate of speed.

To move the tubular clutch spool 178, together with the clutch elements 182 and 183, either leftwardly or rightwardly from its resiliently biased position, as shown in Fig. 2, there is provided a hydraulic control system as will hereinafter be more fully described in connection with Fig. 3. As shown in Fig. 2, a rapid traverse hydraulic supply line 207 and a feed drive hydraulic supply line 208 are respectively connected to supply hydraulic fluid to the opposite ends of the rate change shaft 167. The rapid traverse supply line 207 is connected to an hydraulic coupling 209 that in turn is connected to supply fluid to a drilled line 211 formed in the leftward and central portion of the rate change shaft 167. The axially drilled line 211 is connected to a radial line 212 terminating at an outlet port 213 formed in the periphery of the tubular clutch support member 181. The outlet port 213 communicates with an annular groove 214 formed in the tubular clutch support member 181 to supply hydraulic fluid to a chamber formed leftwardly of the stationary piston 179. Selective admission of hydraulic fluid from the hydraulic line 207, through the drilled lines 211 and 212 to the annular groove 214 thus operates to effect selective leftward movement of the clutch element 182, together with the tubular spool 178 and the clutch element 183. Admission of fluid under pressure through the line 207 operates to effect frictional engagement of the clutch plates 201 and 204 to connect the rapid traverse gear 172 to rotate the rate change shaft 167. It will be apparent that leftward movement of the clutch element 182 effects a corresponding leftward movement of the clutch element 183 to insure complete disengagement of the feed drive clutch plates 195 and 197.

To drive the shaft 167 at feed rate, the feed drive hydraulic line 208 is connected to an hydraulic fitting or connector 216, that in turn supplies hydraulic fluid to an axially drilled line 217 formed in the rightward and central portions of the rate change shaft 167. From the axial line 217, the flow of hydraulic fluid continues through a radial line 218 connected to an outlet port 219 formed in the tubular member 181 and that communicates with an annular groove 220 formed in the periphery thereof. Thus, admission of hydraulic fluid under pressure through the feed drive line 208 effects a build-up of hydraulic pressure in a chamber formed rightwardly of the stationary piston 179, causing rightward movement of the clutch element 183 to connect the feed drive gear 163 for driving the shaft 167 at a selected feed rate. Rightward movement of the clutch element 183 in turn effects rightward movement of the tubular spool 178 and clutch element 182 in a rightward direction to insure disengagement of the rapid traverse clutch plates 201 and 204.

From the rate change shaft 167, power is transmitted to rotate a feed and rapid traverse directional shaft 222 that is rotatably journalled in the spaced apart walls of the frame 54. At its leftward end, the directional shaft 222 is rotatably supported in a bearing 223 having its outer race carried in the left wall of the frame 54. At its opposite rightward end, the directional shaft 222 is carried by a bearing 224 having its outer race carried in the right wall of the frame 54. A gear 225 splined to the leftward end of the rate change shaft 167 is disposed to meshingly engage a gear 226 rotatably journalled on the leftward end of the directional shaft 222 by means of bearings 227 and 228. In a similar manner a gear 231 splined to the rightward end of the rate change shaft 167 engages an idler gear 232 rotatably journalled in the frame 54, and that in turn engages a reverse gear 234 journalled on the rightward end of the directional shaft 222 by means of bearings 236 and 237. In this fashion, the reverse gears 226 and 234 are journalled to rotate in opposite directions at a selected feed or rapid traverse rate of speed.

The reverse gears 226 and 234 are connectable to drive the directional shaft 222 in a selected direction of rotation by means of a pair of multiple disk, reversing or directional clutches 240 and 241 that are respectively interposed therebetween. The common driving gear 80 is secured to the central portion of the directional shaft 222 by means of a key 242 that is likewise disposed to retain tubular clutch support elements 243 and 244 in engagement with the shaft at opposite ends of the shaft. Stationary pistons 246 and 247 are respectively secured to the outer periphery of the tubular support members 243 and 244. Inasmuch as both of the directional clutches 240 and 241 are hydraulically actuated, appropriate oil seals are utilized in well known manner as indicated in the drawing. In addition to the tubular support 244 and stationary piston 247, the clutch 241 comprises a tubular actuating element 248, a tubular spool 249, and an inwardly extending rear plate 250, all of which are secured together for axial slidable movement in either direction. Rightward axial movement of the actuating element 248 operates to urge a plurality of clutch plates 253 and 254 into frictional driving engagement in opposition to a stationary pressure plate 255 secured to the support element 244. The clutch plates 253 are keyed in well known manner to the tubular support element 244, and the clutch plates 254 are engaged at their outer periphery by a plurality of inwardly extending arms integrally formed with the directional gear 234. To retain the directional clutch 241 in normally disengaged position, a plurality of circumferentially spaced compression springs 257 are interposed between the circular plate 250 and the stationary piston 247, thereby operating to urge the tubular spool 249 and the actuating element 248 in a leftward direction.

In like manner, the tubular support element 243 and stationary piston 246 are disposed to guidably support an actuating element 258, a tubular spool 259 and a circular plate 260 for unitary axial movement in either direction. Thus, leftward outward movement of the actuating element 258 operates to urge clutch plates 262, secured at their outer periphery to the directional gear 226, into frictional driving engagement with a plurality of clutch plates 263, keyed to the support element 243, in opposition to a stationary pressure plate 264. Resiliently biased rightward movement of the actuating element 258 and tubular spool 259 is effected by a plurality of circumferentially spaced compression springs 265 interposed between the stationary piston 246 and the circular plate 260.

Although the directional clutches 240 and 241 are shown and described as being resiliently biased to a disengaged position, this condition occurs only prior to energizing the entire machine and activating the hydraulic system as will hereinafter be more fully described. In a normal operating condition, after the hydraulic system has been activated, both of the directional clutches 240 and 241 are simultaneously moved into engagement in order to lock both the directional shaft 222 and the common driving pinion 80 secured thereto against rotation. Likewise, with the machine energized and with the worktable in neutral, both the rapid traverse clutch 173 and the feed drive clutch 164 are retained in a neutral disengaged position. With both of the clutches 240 and 241 simultaneously engaged, the common drive gear is simultaneously and reversibly connected to the stationary rate change shaft 167 thereby locking the nut elements against rotation, and the worktable against movement in either direction. With the hydraulic system activated, operating the machine to effect rightward or leftward movement of the worktable 23 effects disengagement of one of the directional clutches 240 or 241, and simultaneously therewith, engagement of the feed drive clutch 164 or the rapid traverse clutch 173, in accordance with the selected table rate. Conversely, to stop table movement in either direction, both the feed clutch 164 and rapid traverse clutch 173 are urged to the neutral disengaged position and, simultaneously therewith, both of the directional clutches 240 and 241 are moved into engagement with the directional shaft 222, thereby locking the table 23 against further movement. It will be apparent that this arrangement for actuating the rate change clutches 164 and 173, and more particularly clutches 240 and 241, will effect a quick stopping action or braking on further movement of the worktable 23. The proper sequential operation of the rate change and directional clutches is effected by the hydraulic control circuit, as will hereinafter be more fully explained, in response to an electrical control circuit.

To supply hydraulic fluid under pressure for actuating the directional clutches 240 and 241, a pair of hydraulic supply lines 269 and 270 are respectively connected to a pair of tubular hydraulic couplings 271 and 272 operatively disposed at the opposite ends of the directional shaft 222. From the coupling 271, the flow of hydraulic fluid continues through an axially drilled line 274 and a radial line 275 communicating with an annular groove 276 formed in the support element 243. Admission of hydraulic fluid under pressure from the line 269, through the drilled lines and the annular groove 276 effects leftward movement of the actuating element 258 relative to the stationary piston 246 to engage the directional clutch 240 for coupling the reverse gear 226 to the shaft 222.

In a similar manner, hydraulic fluid from the tubular coupling 272 is transmitted through an axial drilled line 278 to a radial line 279 formed toward the rightward end of the shaft 222, and that communicates with an annular groove 280 formed in the support element 244. Thus, admission of hydraulic fluid under pressure through the drilled lines 278 and 279 effects a rightward movement of the actuating element 248 relative to the stationary piston 247 to engage the directional clutch 241 for coupling the reverse gear 234 to the directional shaft 222. As hereinbefore explained, the gears 226 and 234 are respectively connected to be reversibly driven by the gears 225 and 231, both of which are keyed to the rate change shaft 167. It will be apparent, therefore, that with the reversing gears 226 and 234 coupled directly to the shaft 222 by simultaneous engagement of the clutches 240 and 241, both the directional shaft and common driving pinion 80 will be immovably locked against rotation in either direction.

Figure 3:
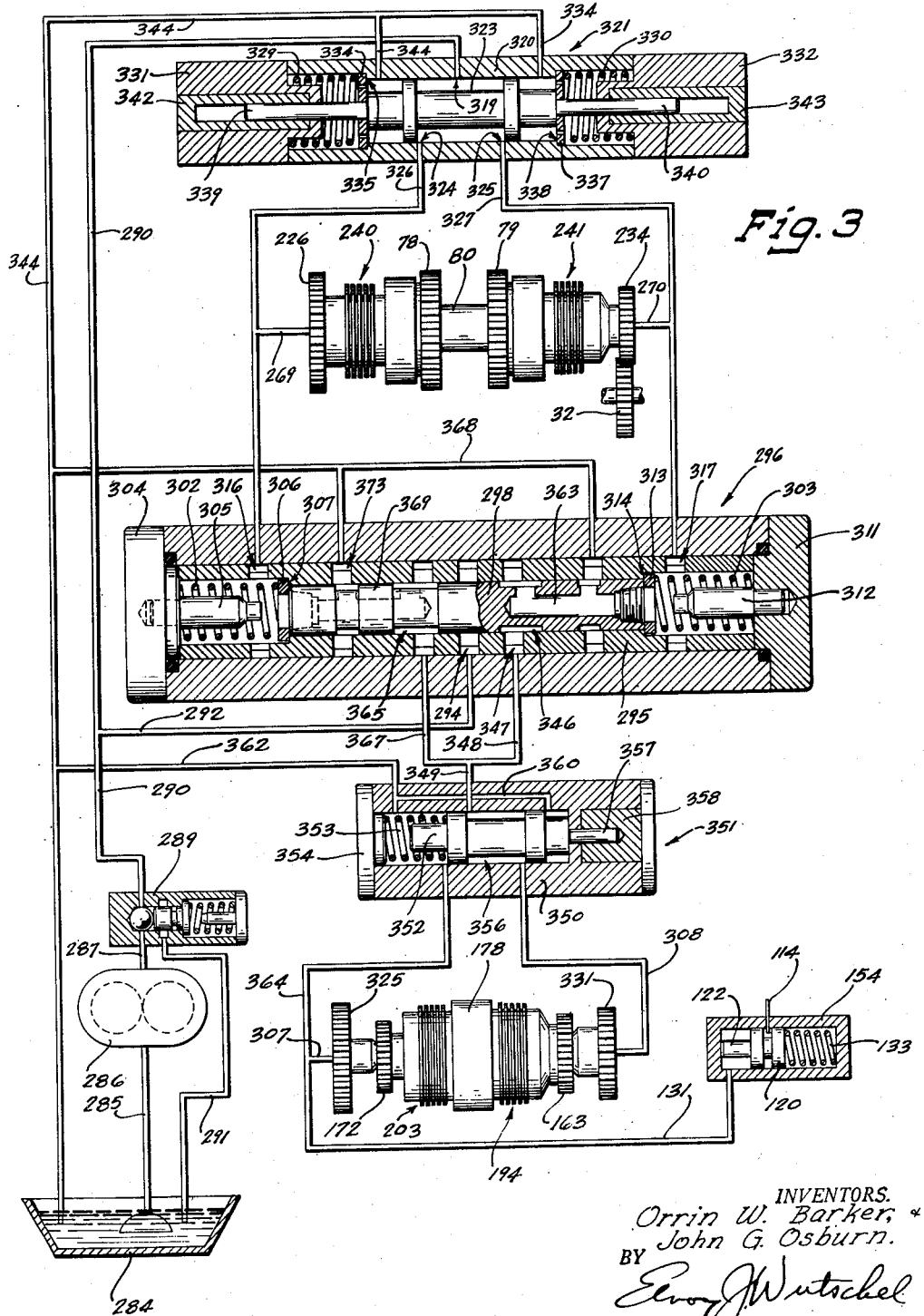
Fig. 3 is a schematic representation of a hydraulic control circuit for selectively actuating the table directional clutches, the feed and rapid traverse clutches, and for selectively releasing the anti-backlash mechanism.

To effect selective actuation of the rate change clutches 194, 202 and the directional clutches 240, 241, the hydraulic control system illustrated schematically in Fig. 3 is connected to receive hydraulic fluid from a sump 284 contained within the hollow machine bed 12, Fig. 1. Hydraulic fluid is withdrawn from the sump 284 through a line 285 by a gear type pressure pump 286 that is connected in well known manner to be driven by the main drive feed motor 27 located within the machine bed 12. From the pump 286, hydraulic fluid under pressure is transmitted through an outlet line 287, through a pressure regulating relief valve 289 and thence to a main pressure supply line 290. The pressure regulating valve 289 is operative in well known manner to provide a source of uniform hydraulic pressure to the supply line 290, and is likewise provided with a return line 291 that is connected to return the overflow to the sump 284. From the supply line 290, a branch line 292 is connected to supply hydraulic fluid under pressure to an inlet port 294 contained within one wall of a tubular valve body 295 fixedly carried within the cylindrical casing of a hydraulically actuated interlock valve 296. In the condition of operation illustrated in Fig. 3, continued flow of hydraulic fluid through the inlet port 294 is interrupted by a circular dwell formed on the central portion of a valve spool 298 that is slidably positioned within the valve body 295 for axial slidable movement in either direction.

To initially urge the valve spool 298 to its neutral central position within the valve body 295, as shown in Fig. 3, there are provided at the opposite ends of the valve spool a pair of compression springs 302 and 303. The spring 302 is positioned within a slightly enlarged circular cavity and is seated at its outer end against an end plate 304 secured to the leftward end of the casing for the valve body 295. The spring 302 is disposed to encircle a stop pin 305 extending inwardly from the end plate 304, and is seated at its inner end against an axially movable stop washer 306 that is restrained against further inward movement by means of a flanged shoulder 307. The opposing spring 303 is positioned within an enlarged circular recess toward the opposite end of the valve body 295, and is seated against an end plate 311 in a manner to encircle an inwardly extending stop pin 312. At its inner end the spring 303 is seated against a stop washer 313 carried for axial slidable movement within the enlarged circular recess, and being restrained against further inward movement by a flanged shoulder 314.

In the condition illustrated in Fig. 3, the stop washers 306 and 313 are disposed to simultaneously abut, with their inner faces, the flanged shoulders 307 and 314, as well as the opposite ends of the axially movable valve spool 298. The valve spool 298 is initially positioned in its central position to obstruct the inward flow of fluid pressure through the port 294 of the interlock valve by operation of the springs 302 and 303. As soon as the machine is energized to activate the hydraulic system, and with the directional clutches 240 and 241 in neutral engaged position, hydraulic fluid under the same pressure is admitted through a pair of ports 316 and 317 to a pair of closed cylinders constituted in part by the circular recesses containing the springs 302 and 303. Any subsequent reduction in pressure in one or the other of the circular cylinders or recesses at the opposite ends of the valve spool 298, operates to effect a movement of the valve spool together with one or the other of the stop washers 306 and 313 in the same direction. Axial movement of the valve spool 298 toward the cylinder having the reduced pressure is limited by either the stop pin 305 or the stop pin 312, depending upon the direction of movement.

With the branch line 292 filled, the flow of fluid under pressure continues through the main line 290 to an inlet port 319 formed in the tubular valve body 320 of a directional valve 321. With an axially movable valve spool 323 of the directional valve 321 in its central neutral position, as shown in Fig. 3, the flow of pressure continues from the inlet port 319 into a hollow tubular chamber delimited by the valve spool, and thence through a pair of outlet ports 324 and 325 formed in the valve body 320. From the outlet ports 324 and 325, the flow of fluid under pressure continues through a pair of hydraulic lines 326 and 327 connected at their opposite ends to the inlet ports 316 and 317. Thus, there is provided hydraulic fluid under pressure in the circular closed cylinders of chambers formed at the opposite ends of the valve spool 298 of the interlock valve 296.

Hydraulic fluid under pressure is likewise transmitted from the lines 326 and 327 through the branch lines 269 and 270 respectively connected to the opposite ends of the directional shaft 222, as shown in Figs. 2 and 3. As hereinbefore explained, admission of hydraulic fluid under pressure through the lines 269 and 270 operates to effect a simultaneous engagement of the directional clutches 240 and 241 respectively, thereby locking both the directional shaft 222 and the common drive gear 80 against rotation in either direction.

To retain the valve spool 323 of the directional valve 321 in its central neutral position as shown, there are provided at the opposite ends of the valve spool a pair of compression springs 329 and 330 respectively positioned within enlarged circular recesses formed in the valve body 320. At their outer ends, the springs 329 and 330 are seated against the inner faces of tubular housings 331 and 332, respectively, that are secured to the opposite ends of the valve body 320. At its inner end, the spring 329 abuts one face of an axially movable washer 334 that is restrained against further inward movement by means of a flanged shoulder 335. In a similar manner, the inner end of the spring 330 is seated against a washer 337 that is restrained against further inward movement by means of a flanged shoulder 338. With the valve spool positioned to permit a continuous flow of pressure from the inlet port 319 to the lines 326 and 327, the inner faces of the washers 334 and 337 are disposed to simultaneously abut both the shoulders 335 and 338, respectively, as well as the opposite ends of the valve spool 323. To provide for selective operation of the directional valve 321, a pair of actuating rods 339 and 340 extending from the opposite ends of the valve spool 323 are respectively disposed to coact with solenoid coils 342 and 343 carried by the housings 331 and 332.

As will hereinafter be explained, an electrical control circuit is provided to effect selective energization of one or another of the solenoid coils 342 or 343 and thereby effect axial movement of the valve spool 323 in the required direction. With the coil 342 energized, for example, the valve spool 323 is moved to its extreme leftward position in opposition to the movable washer 334 and spring 329. Likewise, with the coil 343 energized, the valve spool 323 will be moved from the central neutral position shown to its extreme rightward position in opposition to the movable washer 327 and spring 330. An electrical interlock arrangement is provided to prevent simultaneous energization of the solenoid coils 342 and 343.

It will now be assumed that the machine is to be operated in a manner that the worktable 23 is moved leftwardly along the bed 12 at a work feeding rate. To accomplish this, as shown in Fig. 2, it is necessary that the directional clutch 240 be disengaged leaving the directional clutch 241 in hydraulically actuated engagement, as hereinbefore described. Simultaneously therewith, it is necessary that the feed drive clutch 194 be engaged to effect a transmission of input power to the directional shaft 222. To selectively actuate the clutches in coordinated relationship for effecting leftward feeding movement of the table, the solenoid coil 343, Fig. 3, is energized to effect rightward movement of the valve spool 323. With the valve spool 323 of the directional valve 321 in its rightward position, hydraulic fluid under pressure from the inlet port 319 continues to flow through the line 327 to the branch line 270 as well as the inlet port 317 in the interlock valve 296. At the same time, however, rightward movement of the valve spool 323 effects a connection of the line 326 to an exhaust or return line 344 connected at its opposite end to return fluid to the sump 284. The cessation of pressure in the line 326 and branch line 269 connected thereto permits the directional clutch 240 to move to disengaged position. Simultaneously therewith, reduced pressure at the port 316 in the interlock valve 296 creates an unbalanced pressure condition within the circular cylinders or chambers at the opposite ends of the valve spool 298. Thus, the continued hydraulic pressure through the port 317 at the rightward end of the interlock valve 296 forces the valve spool 298 to move to its extreme leftward position.

With the valve spool 298 retained in leftward position, the flow of fluid under pressure continues from the branch line 292 through the inlet port 294 and thence through a cannelure 346 formed in the valve spool 298 through an outlet port 347 in the valve body 295. From the outlet port 347, the flow of fluid continues through a line 348 and a common line 349 to an inlet port formed in a tubular valve body 350 of a rate change valve 351. Within the tubular valve body 350 there is slidably carried a valve spool 352 that is axially movable to one of two operating positions. As shown in Fig. 3, the valve spool 352 is retained in its rightward position by means of a compression spring 353 interposed between the movable spool and an end plate 354 secured to the leftward end of the valve body 350. With the valve spool 352 resiliently biased to its extreme rightward position as indicated, the flow of pressure fluid continues from the common line 349 about a cannelure 356, and thence through an outlet port in the valve body 350 to the hydraulic line 308. As hereinbefore explained, and as shown in Figs. 2 and 3, hydraulic fluid under pressure from the line 308 operates to engage the feed drive clutch 194.

Thus, energization of the solenoid 343 to effect leftward movement, operates almost simultaneously to effect a disengagement of the directional clutch 240 and an engagement of the feed drive clutch 194. As soon as this occurs, the table is moved in a leftwardly direction since the directional clutch 241 is retained in engagement by the hydraulic fluid under pressure in the branch line 270 and the supply line 327. With the table moving in a leftwardly direction at feed rate as described, the rate change valve 351 may then be actuated to increase the rate of table travel to a fast or rapid traverse rate. To accomplish this, the movable valve spool 352 and the directional valve 351 is provided with a rightwardly extending actuating plunger 357 disposed to coact with a solenoid coil 358 within the valve body 350. Energization of the solenoid coil 358 urges the valve spool 352 to its extreme leftward position in opposition to the spring 353. With the valve spool 352 retained in its extreme leftward position, the pressure line 308 is then connected via a cannelure on the rightward end of the valve spool to a drilled line 360 in the valve body and thence through a branch exhaust line 362 connected at its opposite end to the main exhaust line 344. Simultaneously therewith, the common pressure supply line 349 is connected via the cannelure 356 to an outlet port in the valve body 350 that connects with a line 364. With hydraulic fluid under pressure being supplied to the line 364, the flow of pressure fluid continues through the branch line 307 to effect engagement of the rapid traverse clutch 203, as shown in Figs. 2 and 3. Likewise, with the valve spool 352 retained in its leftward position, the flow of fluid under pressure continues from the line 364 to the line 131 to effect rightward movement of the piston 120 in opposition to the spring 133, as shown in Figs. 3 and 5. Hydraulically actuated rightward movement of the piston 120 operates to ease off the anti-backlash mechanism, Fig. 2, during the rapid traverse rate of travel, as hereinbefore explained.

Resuming the feed rate of the worktable in the leftward direction is accomplished by deenergizing the solenoid coil 358 of the rate change valve 351, permitting the spring 353 to urge the valve spool 352 to its extreme rightward position. Rightward movement of the valve spool 352 again effects an operative connection between the common supply line 349 to the line 308, thereby effecting a re-engagement of the feed drive clutch 194. Likewise, the line 364 is connected via a cannelure formed on the leftward end of the valve spool 352 to the exhaust line 344, thus effecting a simultaneous disengagement of the rapid traverse clutch 203 and leftward movement of the piston 120 in response to the spring 133. With this condition existing, table movement in a leftward direction is continued at the selected feed rate and the anti-backlash mechanism is re-engaged to its predetermined adjusted position.

In a similar manner, the worktable 23 is connectable to be moved in a rightward direction at a selected feed or rapid traverse rate of travel. To accomplish this, the valve spool 323 of the directional valve 321 is moved leftwardly from its central neutral position by energizing the solenoid coil 342. With the valve spool 323 retained in its extreme leftward position, the hydraulic line 327 is connected via a cannelure formed at the rightward end of the valve spool 323 to the exhaust line 344, thereby effecting disengagement of the direction clutch 241 and a lack of pressure in the circular chamber formed toward the rightward end of the interlock valve 296. With the valve spool 323 retained in leftward position, the flow of hydraulic fluid under pressure from the main supply line 319 continues about the cannelure formed in the central part of the valve spool to the line 326 to retain the directional clutch 240 in engagement, and to maintain full pressure within the circular chamber formed toward the leftward end of the interlock valve 296. As a consequence, the valve spool 298 of the interlock valve 296 is moved to its extreme rightward position, thus effecting an operative connection from the main supply line through the pressure inlet port 294, thence through a cannelure 365 formed in the valve spool to a hydraulic line 367 connected to the common line 349. As soon as the common line 349 is connected to receive hydraulic fluid under pressure, either the feed clutch 194 or the rapid traverse clutch 203 is engaged, depending upon the selected position of the axially movable valve spool 352 of the rate change valve 351, as hereinbefore explained.

With the directional valve 321 actuated to effect either leftward or rightward movement of the table, it will be apparent that deenergization of both of the coils 342 and 343 will permit a return of the valve spool 323 to its central position, thus effecting an immediate cessation in table movement. With the valve spool 323 returned to neutral position, pressure fluid is again directed through the lines 326 and 327, thereby effecting a simultaneous engagement of the directional clutches 240 and 241. At the same time hydraulic pressure in the lines 326 and 327 effects a return of the interlock valve spool 298 to its central neutral position to effect a disengagement of either the rapid traverse clutch 203 or the feed clutch 194. At this time hydraulic fluid from one or another of the clutches is exhausted through the rate change valve 351 and thence through the common line 349 to the lines 367 and 348. From the line 348, the exhaust flow of fluid continues through the port 347, a drilled line 363 in the valve spool 298, to an exhaust line 368 connected to the main return line 344. In a similar manner the exhaust flow of fluid from the line 367 continues through another drilled line 369 in the valve spool 298, and thence through an outlet port 373 connected to the exhaust line 368.

It will be apparent that engagement of either the feed clutch 194 or the rapid traverse clutch 203 is prevented unless the valve spool 298 of the interlock valve 296 is moved to either of its extreme positions of movement in order to permit a flow of hydraulic fluid under pressure directly from the main supply line 290, through the respectively described cannelures on the valve spool 298 to the common supply line 349 connected to the rate change valve 351. Actuation of the interlock valve spool 298 in turn is prevented unless one or the other of the directional clutches 240 and 241 has been disengaged by selected movement of the valve spool 323 of the directional valve 321. This arrangement is particularly advantageous because it provides for effecting a retention of both of the directional clutches 240 and 241 in operative engagement to positively lock the worktable 23 against movement in either direction along the bed. Likewise, it permits an extremely fast operating clutching arrangement for connecting the transmission mechanism to drive the worktable in a selected direction of travel at the desired feed or rapid traverse rate. After the table has been moved in the required direction, the control system is so coordinated as to effect an immediate disengagement of the feed drive train as well as a positive braking action to minimize table overtravel in the selected direction of movement. In addition, the entire control and transmission system is disposed to provide an extremely rapid response, both in changing from feed to rapid traverse rates of movement and vice versa, as well as reversing the direction of table movement, and stopping table movement at predetermined points in its selected path of travel.

Selective easing off of the anti-backlash mechanism, as well as the re-engagement of the mechanism to its predetermined adjusted position, Figs. 2 and 3, is likewise controlled by the movement of the valve spool 298 of the interlock valve 296, as well as the selected positioning movement of the rate change valve 351. By means of the aforedescribed arrangement, the anti-backlash mechanism is connected to be engaged or eased off upon movement of the piston 120 in coordinated relationship with the engagement of the feed drive clutch 194 or the rapid traverse clutch 202 respectively.

To selectively energize the motors 18 and 27, Fig. 1, as well as to actuate the hydraulic control system, Fig. 3, there is provided an electrical power supply and control circuit shown in simplified diagrammatic form in Fig. 4. For energizing the control circuit, electrical energy is derived from a power source (not shown) by means of line conductors $L_1$, $L_2$ and $L_3$, that are connected to energize a power supply circuit represented by dark lines in the drawings. A control circuit, represented by light lines, is connected to receive electrical energy from a transformer 370 having a primary winding connected to the line conductors $L_1$ and $L_3$. The transformer 370 is provided with a secondary winding adapted to provide electrical energy of the required voltage to the low voltage control circuit via a pair of conductors 371 and 372.

Energization of the control circuit is effected by momentarily depressing a master control start button switch 374 to permit a flow of current from the energized conductor 371, through the normally closed contact bar of the master stop button switch 375 and thence to a conductor 376. From the conductor 376, the current flow continues through the momentarily closed contact bar of the switch 374, through a conductor 377, and then through a branch conductor 378 connected to one terminal of a coil for a master start relay 380. Continued current flow through the coil to a conductor 381 to the energized conductor 372 effects energization of the coil to move the contact bars of the relay 380 upwardly to closed position. A holding circuit for retaining the relay 380 in closed position is then completed from one terminal of the coil thereof through the branch conductor 378, the conductor 377 the upper closed contact bar of the relay 380 and a shunt conductor 382 connected to the energized conductor 376. With the relay 380 being maintained in closed position, the energized supply conductor 372 is then connected through the lower closed contact bar of the relay to energize a conductor 383.

After the relay 380 has been closed to energize the conductor 383, a circuit can be completed to energize the spindle motor 18 and feed motor 27 by momentarily depressing a start button switch 385. The flow of current then continues from the energized conductor 383, through the normally closed contact bar of a stop button switch 386, a conductor 387 and the momentarily closed contact bar of the start switch 385 to energize a conductor 388. From the energized conductor 388, the current flow continues through a branch conductor 389 connected to one terminal of a solenoid coil 390 associated with a spindle motor start relay 391. The starting circuit is completed from the opposite terminal of the coil 390 through a conductor 392 and a conductor 393 connected to the energized conductor 382. Energization of the coil 390 effects upward movement of the contact bars of the spindle motor relay 391 to a closed position, thereby completing a holding circuit through the branch conductor 389, the conductor 388, the lower closed contact bar 395, to a conductor 396, and thence through a conductor 397 connected to the energized conductor 387.

Concomitantly with closure of the spindle motor relay 391, a feed motor starting relay 398 is moved upwardly to closed position by energization of a coil 399 associated therewith. Since the coil 399 is operatively interconnected between the conductor 388 and a conductor 402 connected to the energized conductor 393; depressing the start button switch 385 energizes the coil 399 to effect upward movement of the contact bars of the feed motor relay 398 to closed position. Upon releasing the start button switch 385, a holding circuit for the feed relay 398 is established from the coil 399, the conductor 388, the closed contact bar 395 of the relay 391, and the energized conductor 396.

With the contact bars of the relays 391 and 398 being retained in upwardly closed position, power supply circuits are then established to energize both the spindle motor 18 and the feed motor 27. Closure of the spindle motor relay 391 completes a circuit from the line conductors $L_1$, $L_2$ and $L_3$ to conductors 403, 404 and 405 respectively that are connected to energize the spindle motor 18. In like manner, closure of the feed motor relay 398, completes a circuit from the line conductors $L_1$, $L_2$ and $L_3$ to conductors 407, 408 and 409 respectively connected to energize the feed motor 27. After the feed motor 27 and the spindle motor 18 have been energized to rotate, power is connected to rotatably drive the rate change gears 172 and 163 in the feed transmission, Fig. 2, and is likewise available to rotatably drive the tool spindle 17, Fig. 1. Simultaneously therewith, the motor 27 is connected to drive the hydraulic pump 286, Fig. 3, for supplying hydraulic fluid under pressure to the main supply line 290, thereby rendering the hydraulic control system operative.

To effect movement of the worktable in either a rightward or leftward direction, there are provided a pair of start button switches 411 and 412, as shown in Fig. 4. Momentarily depressing and releasing one or the other of the switches 411 and 412 effects a continued movement of the worktable in a rightward or leftward direction respectively. To stop movement of the worktable, there is provided a common stop button switch 414 which, when depressed, stops further movement of the worktable irrespective of its direction of movement. After table movement in a selected direction has been initiated, the rate of movement can be increased to a rapid traverse rate as long as a rapid traverse start button switch 415 is retained in the depressed position.

Movement of the table start switch 411 to momentary depressed position effects movement of a lower contact bar 417 to open position, and movement of an upper contact bar 416 to closed position bridging a pair of contacts respectively connected to conductors 419 and 420. With the feed motor relay 398 energized to closed position, the conductor 420 extending from one terminal of the start switch 411 is energized by being connected to a conductor 321, the normally closed contact bar 422 of the switch 412 to a conductor 423. From the conductor 423 the circuit continues through a conductor 425, the closed contact bar 426 of the switch 414, to a conductor 427 and a conductor 428 connected through the closed contact bar 429 of the relay 398 to the energized conductor 397.

Actuating the start switch 411 thus operates to complete a circuit from the energized conductor 420 through the closed contact bar 416 to the conductor 419. The circuit continues from the conductor 419 through a branch conductor 431, through the coil of a relay 432 to another conductor 433 connected at its opposite end to the energized conductor 393. Upward movement of the contact bars of the relay 432 to a closed position is effected by energization of the coil, a holding circuit being then established through the branch conductor 431, conductor 419, and the closed upper contact bar of the relay 432 to a conductor 434. The holding circuit is completed from the conductor 434, through a conductor 436, and thence through the closed lower contact bar of the relay 432 to the energized conductor 420. With the relay 432 retained in upward closed position, another circuit is completed from the energized conductor 420, through the lower contact bar of the relay to the conductor 436 connected to one terminal of the solenoid coil 342 for the directional valve 321. The opposite terminal of the coil 342 is connected through a conductor 437 to the energized conductor 393, thereby energizing the coil 342 to effect leftward movement of the valve spool 323 in the directional control valve 321, Fig. 3. With this condition existing, the table is connected to be moved in a rightward direction at feed rate, as hereinbefore described.

While the table is continuing to move rightwardly at feed rate, in response to depressing the start button switch 411, the direction of table movement can be immediately reversed by momentarily depressing and then releasing the start button switch 412. Depressing the switch 412 effects downward movement of a normally open upper contact bar 439 into bridging engagement with a pair of contacts respectively connected to conductors 441 and 442. At the same time the normally closed lower contact bar 422 is moved downwardly to interrupt the circuit from conductors 421 to 423, thereby interrupting a holding circuit and permitting the relay 432 to drop downwardly to open position. Movement of the relay 432 to open position in turn effects deenergization of the solenoid coil 342, thus permitting the valve spool 323, Fig. 3, in the directional valve 321 to return to its central neutral position to stop table movement.

The conductor 442 is energized by means of a conductor 443 that in turn is connected through the normally closed contact bar 417 of the switch 411 to the energized conductors 423 and 425. A circuit is thus completed from the energized conductor 442, through the momentarily depressed contact bar 439, to the conductor 441 that is connected through a branch conductor 444 to one terminal of a coil for a directional relay 446. From the conductor 444, current flows through the coil of the relay 446 to a conductor 447 connected to the energized conductor 433 thereby effecting upward movement of the contact bars of the relay 446 to closed position. A holding circuit for the relay 446 is then established from the coil through the branch conductor 444, the conductor 441, the upper closed contact bar of the relay to a conductor 448. The holding circuit continues from the conductor 448 to a portion of a conductor 449 and the lower closed contact bar of the relay 446 to the energized conductor 442. With the relay 446 retained in upwardly closed position, another circuit is completed from the energized conductor 442, to the lower closed contact bar of the relay, and the conductor 449 to one terminal of the solenoid coil 343 of the directional valve 321. The circuit for energizing the coil 343 continues through the coil, a conductor 451 and thence through the conductor 437 to the energized conductor 393. As hereinbefore explained, energization of the solenoid coil 343 effects a rightward movement of the valve spool 323, Fig. 3, in the directional valve 321 to effect leftward feeding movement of the worktable.

The rate of table movement can be increased from feed to rapid traverse, irrespective of the direction of movement, by depressing the rapid traverse start button switch 415. The fast or rapid rate of table movement will continue as long as the switch 415 is held in depressed position. Depressing the switch 415 completes a circuit extending from the energized conductor 428, through the closed contact bar of the switch 415 to a conductor 452 connected to one terminal of the solenoid coil 358 for the rate change valve 351. This circuit likewise continues from the coil 358 to the energized conductor 393, thereby energizing the coil for effecting leftward movement of the valve spool 352 as hereinbefore described. It will be apparent that the rapid traverse switch 415 can be depressed either prior to, or subsequent to, depressing one or another of the start switches 411 and 412 to initiate directional movement of the table. If the rapid traverse switch 415 is retained in depressed position at the time one of the directional switches 411 or 412, is depressed, then the table will immediately begin to move in a selected direction at a rapid traverse rate of travel.

With the table connected to be driven in either direction and at either feed or rapid traverse rate, depressing the common stop button switch 414 operates to effect an immediate cessation of table movement. Depressing the stop switch 414 effects downward movement of the contact bar 426 to interrupt the circuit from conductor 425 through the contact bar to conductor 427. Interruption of the circuit by downward movement of contact bar 426 likewise interrupts the holding circuit to whichever of the directional relays 432 or 446 that has been energized to closed position for effecting the selected directional table movement. Movement of the relays, 432 or 446 to open position in turn interrupts the circuit to one or another of the coils 342 and 343, permitting resiliently biased return of the valve spool 323, Fig. 3, to its central neutral position.

The normally closed lower contact bars 417 and 422 of the directional switches 411 and 412 respectively are so interconnected in the circuit as to preclude simultaneous energization of the directional relays 432 and 446. For example, downward movement of the directional switch 411 operates to energize the directional relay 432 to closed position. Downward movement of the lower contact bar 417 of the switch 411, however, operates to interrupt any holding circuit which had previously been established to the coil of the other directional relay 446. In a similar manner, downward movement of the directional switch 412 operates to effect a holding circuit to the coil of the directional relay 446. At the same time, downward movement of normally closed contact bar 422 is operative to interrupt any holding circuit which had previously been established to the coil of the directional relay 432. Thus each time the direction of table travel is reversed, the valve spool 323, Fig. 3, is moved from one extreme end position, through its neutral position to the opposite extreme end position for effecting reverse movement of the table. In passing through its neutral position, the valve spool 323 is so interconnected in the hydraulic circuit as to effect a simultaneous engagement of the directional clutches 240 and 241, thereby causing a quick braking action on table movement immediately prior to the selected reverse movement being initiated.

From the foregoing explanation of the construction and operation of a preferred embodiment of the invention, it is apparent that the invention provides a greatly improved, selectively adjustable anti-backlash mechanism for removing the lash between the cooperatively and threadedly engaged elements of a screw and nut translating mechanism. Hydraulically actuated means are provided to ease off the anti-backlash mechanism during certain conditions of operation to preclude excessive wear whenever the cooperating screw and nut elements are relatively rotated at fast rates of speed. Likewise, to facilitate selective manual adjustment of the axially movable nut elements relative to one another for varying the degree of lash removal, there is provided an improved antifriction adjusting sleeve that is carried for both rotatable and axial movement and connected to effect relative movement between a pair of spaced apart nut elements engaging the same feed screw. The arrangement is such as to reduce to a minimum any frictional resistance during adjustment. The anti-friction adjusting sleeve likewise provides an extremely fast response whenever the hydraulic means are actuated to ease off the anti-backlash mechanism whenever the screw and nut mechanism is to be operated at higher rates of speed.

Although only one embodiment of the invention has been shown and described, it will be apparent to those skilled in the art to which this invention relates, that various modifications in the manner of constructing the anti-backlash mechanism may be made without departing from the spirit and scope of the invention as defined in the subjoined claims.

The principles of this invention having now been fully explained in connection with the foregoing description, we hereby claim as our invention:

1. In a backlash eliminator for a machine tool, a non-rotatable longitudinally translatable feed screw, a pair of non-translatable rotatable nuts threadedly engaging said feed screw in spaced apart relationship, one of said nuts being carried for slight axial movement relative to the other of said nuts, an adjusting sleeve bearing encircling one of said nuts being connected both to support it for rotation and to move it axially toward said other nut to obviate backlash between said feed screw and said nuts, means for rotatably driving said nuts including means for maintaining said nuts in positions of constant angularity relative to said screw, a rotatably journalled helical gear connected to rotate said sleeve bearing in a manner to cause it to move axially for urging said associated nut to move axially toward the other of said nuts, a second rotatably journalled helical gear disposed to meshingly engage said first helical gear and being carried for a slight axial movement, and a pair of separate control mechanisms respectively connected to effect selective rotatable and axial movement of said second helical gear for rotating said first helical gear in a manner to effect axial movement of said associated nut toward the other of said nuts and thereby selectively tightening the engagement between said feed screw and said nuts.

2. In a machine tool, a frame, a support member slidably carried by said frame, a first rotatable nut and a cooperating non-rotatable feed screw operatively connected to move said support member relative to said frame, a second rotatable nut engaging said feed screw in spaced relationship to said first nut, a pair of gears respectively secured to said rotatable nuts, a rotatably journalled common driving pinion connected to meshingly engage said gears and being disposed to maintain said nuts in constant angularity relative to said feed screw, an antifriction adjusting sleeve bearing encircling one of said nuts and being connected both to support it for rotation and to move it axially toward the other of said nuts, said sleeve bearing being provided with an external helically formed ball receiving groove, a hollow cylindrical member encircling said sleeve bearing and being provided with an internal helically formed ball receiving groove, a plurality of bearing balls operatively interposed between the grooves formed in said sleeve bearing and said cylindrical member for rolling engagement therebetween stop means connected to retain said bearing balls in operative rolling engagement between said sleeve bearing and said cylinder, a first helical gear operatively connected to rotate said adjusting sleeve bearing, a second transversely journalled helical gear disposed to engage said first helical gear and being carried for slight axial movement, an axially movable piston resiliently urged in one direction and connected to effect axial movement of said second helical gear, resilient means connected to normally urge said piston axially to effect like axial movement of said second helical gear to rotate said first helical gear in a manner to urge said second rotatable nut toward said first nut, hydraulic means connected to predeterminately move said piston in opposition to said resilient means for releasing the axial pressure on said second nut, and a manual adjustment device connected to position said second helical gear in a predetermined degree of rotatable adjustment for rotating said first helical gear to vary the range of movement of said second nut as effected by axial movement of said piston.

3. In combination with a machine tool having a frame, a work support slidable on said frame, a non-rotatable feed screw secured to said table, a pair of spaced apart feed nuts journalled in said frame to engage said screw, a pair of drive gears respectively secured to said nuts, a common pinion disposed to meshingly engage said drive gears, a single shaft connectable to be rotatably driven, a pair of normally engaged reversing clutches interconnected between said shaft and said pinion in a manner to lock said pinion against rotation, a source of power, a rapid traverse clutch and a feed drive clutch respectively engageable to transmit power from said source to drive said shaft at a selected rate, an hydraulic control system actuatable to disengage one of said reversing clutches and simultaneously therewith to engage either said rapid traverse clutch or said feed drive clutch, a selector valve operatively interconnected in said control system being separately actuatable to determine whether said feed or said rapid traverse clutch is engaged upon disengagement of a selected one of said reversing clutches; a rotatable adjusting sleeve connected to effect axial movement of one of said feed nuts toward said other feed nut to remove the backlash between said feed screw and said cooperating feed nuts, said adjusting sleeve being provided on its periphery with a helically formed ball receiving groove, a stationary guide sleeve encircling said adjusting sleeve and being provided with an internally formed ball receiving groove, a plurality of bearing balls operatively constrained for rolling engagement between the cooperating grooves formed in said sleeves, a rotatable helical gear connected to rotate said adjusting sleeve, a worm shaft connected to engage said helical gear, said worm shaft being carried for both rotatable and axial movement, manual means connected to selectively rotate said worm shaft for tightening the degree of engagement between said feed nuts and said feed screw, a resiliently biased piston connected to urge said worm shaft to move axially for tightening the engagement between said feed nuts and said feed screw, and hydraulic means connected to urge said piston in the opposite direction to loosen the engagement between said nuts and said feed screw whenever said selector is actuated to effect engagement of said rapid traverse clutch.

4. In a machine tool, a hollow frame, a worktable slidably mounted on said frame for reciprocable movement, a feed screw secured at its opposite ends to said table and extending across the upper surface of said frame, said frame presenting in its upper portion a pair of upwardly extending axially spaced apart semicircular cavities of different radius concentrically spaced from said screw, said frame presenting an opening between the semicircular cavities into the interior thereof, a cap member removably secured to said frame being provided with axially spaced semicircular cavities complementary to the semicircular frame cavities and cooperating therewith to define a large diameter bore and a small diameter bore, a rotatable nut element directly journalled in the small diameter bore formed by said frame and said cap in a manner to threadedly engage said screw, an antifriction tubular sleeve bearing carried within the large diameter bore formed by said frame and said cap said tubular sleeve bearing having antifriction threaded engagement with its supporting bore in a manner to be axially movable therein relative to said frame, a second nut element threadedly engaging said feed screw and extending through the bore of said tubular sleeve bearing to be journalled therein, said second nut element being connected to be moved axially by said tubular sleeve bearing, a pair of driven gears respectively secured to said nut elements in proximity to the opening presented by said frame, a common power driving gear connected to engage said driven gears, a variable speed transmission connected to rotate said common drive gear for moving said table at feed or rapid traverse rate, a first helical gear connected to rotate said sleeve bearing for urging said second nut element toward said first nut element to eliminate backlash, a transversely journalled second helical gear engaging said first helical gear and being carried for axial movement, a compression spring connected to urge said second helical gear axially for eliminating backlash, locking means connected to lock said second helical gear in a selected angularly adjusted position to adjust the degree of backlash adjustment effected by said spring, a hydraulic piston connected to move said second helical gear in opposition to said spring for releasing the anti-backlash adjustment, and a hydraulic control system including a source of fluid under pressure connectable to simultaneously actuate said transmission for driving said table at rapid rate and to actuate said piston for releasing the anti-backlash adjustment.

References Cited in the file of this patent

UNITED STATES PATENTS

| 1,938,781 | Nenninger et al. | Dec. 12, 1933 |
| 2,124,852 | Graves et al. | July 26, 1938 |
| 2,297,047 | Brinkmann | Sept. 24, 1942 |
| 2,345,194 | Granberg et al. | Mar. 28, 1944 |
| 2,374,719 | Armitage | May 1, 1945 |
| 2,455,368 | Hoffar | Dec. 7, 1948 |
| 2,749,812 | Wetzel | June 12, 1956 |
| 2,781,879 | Ebersold | Feb. 19, 1957 |

FOREIGN PATENTS

| 589,596 | Great Britain | June 25, 1947 |